(12) United States Patent
Peters et al.

(10) Patent No.: US 10,006,800 B2
(45) Date of Patent: Jun. 26, 2018

(54) DEVICE FOR WEIGHING SLAUGHTER PRODUCTS WHEREIN THE WEIGHBRIDGE IS CONFIGURED SO THAT FOUR RUNNERS OF THE PRODUCT CARRIER WILL ROLL SIMULTANEOUSLY ONTO AND OFF OF THE WEIGHBRIDGE

(71) Applicant: MAREL STORK POULTRY PROCESSING B.V., AV Boxmeer (NL)

(72) Inventors: Erik Hendrikus Werner Peters, CX Boxmeer (NL); Gerardus Josef Gertrudis Reintjes, BW Leunen (NL); Tim Sander Rijerse, DR Gemert (NL)

(73) Assignee: MAREL STORK POULTRY PROCESSING B.V., AV Boxmeer (NL)

( * ) Notice: Subject to any disclaimer, the term of this patent is extended or adjusted under 35 U.S.C. 154(b) by 158 days.

(21) Appl. No.: 15/301,229

(22) PCT Filed: Mar. 5, 2015

(86) PCT No.: PCT/NL2015/050138
§ 371 (c)(1),
(2) Date: Sep. 30, 2016

(87) PCT Pub. No.: WO2015/156663
PCT Pub. Date: Oct. 15, 2015

(65) Prior Publication Data
US 2017/0023398 A1  Jan. 26, 2017

(30) Foreign Application Priority Data
Apr. 9, 2014 (NL) ..................... 2012599

(51) Int. Cl.
G01G 19/06 (2006.01)
G01G 11/00 (2006.01)
G01G 21/22 (2006.01)

(52) U.S. Cl.
CPC ............ G01G 19/06 (2013.01); G01G 21/22 (2013.01); G01G 11/00 (2013.01)

(58) Field of Classification Search
CPC ......... G01G 11/00; G01G 19/06; G01G 21/22
(Continued)

(56) References Cited

U.S. PATENT DOCUMENTS 2,716,547 A   8/1955  Thurston
2,815,480 A * 12/1957  Ruge ................... G01G 3/1406
                                                177/145

(Continued)

FOREIGN PATENT DOCUMENTS

WO   WO 2015156663 A1 * 10/2015 ............. G01G 19/06

OTHER PUBLICATIONS

International Search Report, International Patent Application No. PCT/NL2015/050138, dated Apr. 14, 2015.

*Primary Examiner* — Randy Gibson
(74) *Attorney, Agent, or Firm* — Casimir Jones, SC; Robert A. Goetz

(57) ABSTRACT

The invention provides a device for weighing slaughter products, comprising a guide which extends along a conveying path, product carriers which can be moved along the guide and which are configured for suspending slaughter products therefrom, and weighing means comprising a weighbridge. Each product carrier comprises four runners, two of which runners are provided behind the other two runners, seen in the direction of movement. The four runners are configured to roll over the weighbridge along respective tracks during a weighing interval upon movement of the (Continued)

product carrier, which tracks extend parallel to each other, wherein the four runners roll over the weighbridge during the weighing interval and wherein the weighbridge and the four runners are configured such that the runners will roll simultaneously onto the weighbridge and simultaneously off the weighbridge.

15 Claims, 4 Drawing Sheets

(58) Field of Classification Search
USPC .................................... 177/145, 262
See application file for complete search history.

(56) References Cited

U.S. PATENT DOCUMENTS

| 2,873,918 | A | * | 2/1959 | Rosebrook | E01B 11/42 238/174 |
| 3,089,554 | A |  | 5/1963 | Watson |  |
| 4,363,369 | A | * | 12/1982 | Susor | G01G 3/1402 177/145 |
| 4,711,344 | A | * | 12/1987 | Altenpohl | G01G 11/00 177/163 |
| 4,754,822 | A | * | 7/1988 | Altenpohl | G01G 11/046 177/163 |
| 4,817,744 | A | * | 4/1989 | Power, Jr. | B07C 5/18 177/145 |
| 5,434,366 | A | * | 7/1995 | Troisi | G01G 11/00 177/145 |
| 5,576,520 | A | * | 11/1996 | Waterman | B65G 15/105 177/145 |
| 6,084,184 | A | * | 7/2000 | Troisi | G01G 15/00 177/145 |
| 8,237,067 | B2 | * | 8/2012 | Troisi | G01G 11/003 177/145 |

* cited by examiner

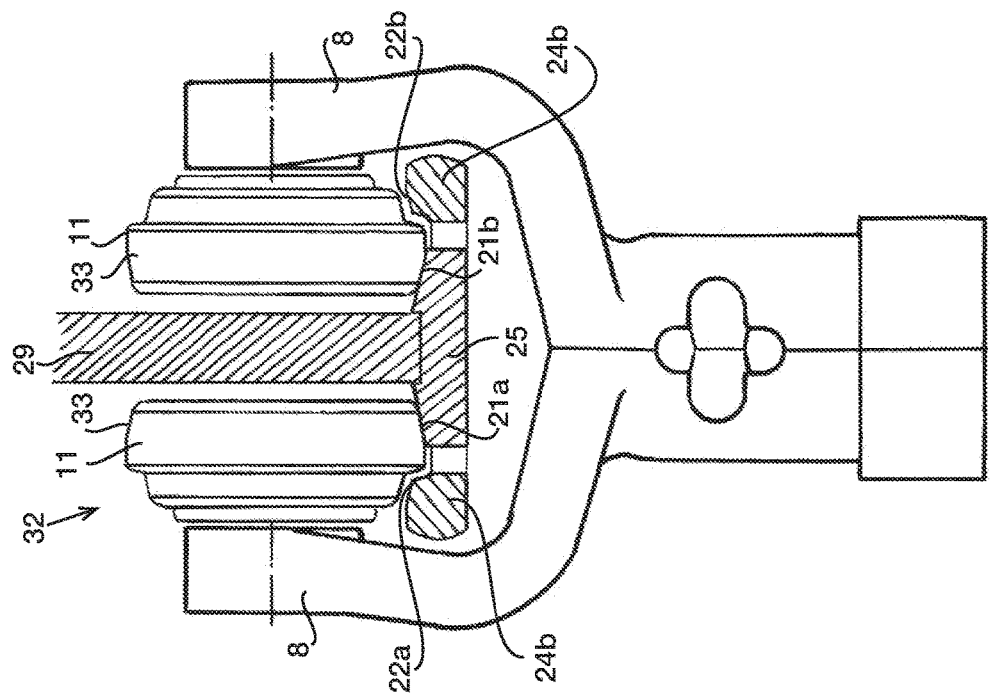
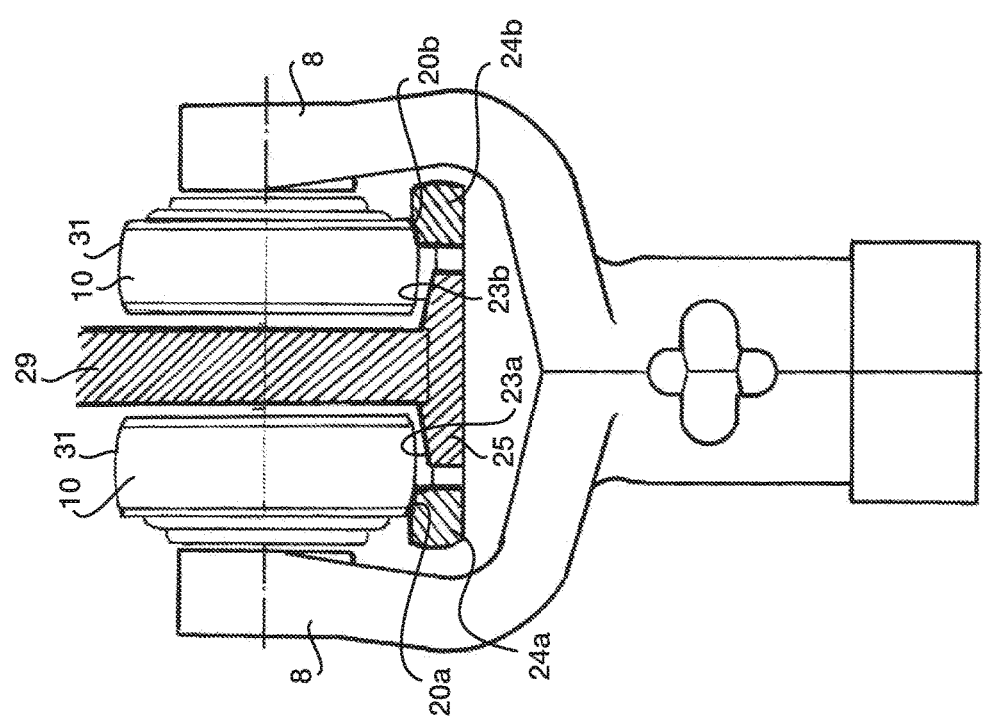

DEVICE FOR WEIGHING SLAUGHTER PRODUCTS WHEREIN THE WEIGHBRIDGE IS CONFIGURED SO THAT FOUR RUNNERS OF THE PRODUCT CARRIER WILL ROLL SIMULTANEOUSLY ONTO AND OFF OF THE WEIGHBRIDGE

The invention relates to a device for weighing slaughter products, comprising a guide which extends along a conveying path, product carriers which can be moved along the guide and which are configured for suspending slaughter products therefrom, and weighing means comprising a weighbridge, each product carrier comprising four runners, two of which runners being provided behind the other two runners, seen in the direction of movement, wherein the four runners are configured to roll over the weighbridge along respective tracks during a weighing interval upon movement of the product carrier.

When processing slaughter products it is necessary, or at least advantageous, to have reliable and accurate data available regarding the weight of individual slaughter products, such as a pig, chicken or fish, or parts thereof. For this purpose use can be made of a weighbridge, by means of which a product carrier with a slaughter product suspended therefrom can be weighed in-line. From the weighing result the weight of the slaughter product in question can then be derived. Such a weighing device is described in International patent application WO 2013/154427 A1. The length of the weighbridge is adapted to the distance apart between adjacent product carriers, such that the possibility of the runners of two successive product carriers simultaneously rolling over the weighbridge is ruled out. Concretely this implies that the length of the weighbridge is selected to be slightly smaller than the pitch between product carriers. In the aforesaid publication each product carrier comprises two coaxial runners. Slaughter products may tend to sway to and fro in the conveying direction during transport. Such swaying interferes with automated operations to be carried out on the slaughter product and/or with the weighing of the slaughter product. To suppress such swaying it is possible to design each product carrier with four runners, two of which runners are provided behind the other two, seen in the direction of movement. As a result, the distance between a rear runner of a product carrier and a front runner of a product carrier directly therebehind is smaller than the pitch between the product carriers. In order to prevent runners of two successive product carriers rolling over the weighbridge simultaneously, a shorter weighbridge can be used. This implies that, assuming that the conveying speed remains unchanged, the length of time during which the runners of a product carrier roll over the weighbridge is reduced and less time is available for the actual weighing process. It should be realised in that regard that the time available for the actual weighing process is not the entire length of time that the runners of a product carrier are present on the weighbridge. The fact is that a fixed portion of said length of time is needed to allow the filters of the weighing installation of which the weighbridge forms part, which function to filter out interfering vibrations, to adjust themselves. Typically this takes 70 ms. The above problem leads to less accurate and less reliable weighing results. The object of the invention is to provide a solution or at least an improvement in that regard.

A device according to the introducing paragraph is described in U.S. Pat. No. 3,089,554, more in particular related to FIGS. 6 and 7 thereof. Use is made of four wheeled trolleys which run along an upper support rail having two internal runways which support the four wheels of the trolleys. A pair of trolleys support a basket for which downwardly extending hooks of each trolley engage a loop secured to the basket which can be loaded with meat. Upon entering a weighing section first the two front wheels of a trolley roll onto the two runways of the support rail and thereafter the two rear wheels of the trolley roll onto the same two runways. Likewise upon leaving a weighing section first to two front wheels of the trolley roll off the two runways and only thereafter the two rear wheels of the trolley roll of the two runways. It will also be clear that first the four wheels of a front trolley of a pair of trolleys carrying a basket, will roll onto the weighing section, be it not simultaneously as explained above, and thereafter the four wheels of the rear trolley of the pair of trolleys will roll onto the weighing section. Likewise first the four wheels of the front trolley roll off the weighing section before the four wheels of the rear trolley roll off the weighing section.

In order to achieve the above mentioned object, the tracks extend parallel to each other, and the weighbridge and the four runners are configured such that the runners will roll simultaneously onto the weighbridge and simultaneously off the weighbridge. The use of a separate track for each of the four runners makes it possible to have the four runners roll onto the weighbridge and off the weighbridge simultaneously in spite of the fact that they are in part arranged behind each other. The weighbridge can thus be configured to be relatively long, so that the time interval available for weighing will be relatively long as well and a relatively accurate weighing result can be obtained.

The invention is suitable for use in an embodiment in which the weighbridge forms part of the endless guide and the four runners are configured to roll over the guide upstream and downstream of the weighbridge during movement of the product carrier. This provides the advantage that the four runners that are used for moving the product carriers along the endless guide are also used in the weighing of the slaughter products. This directly implies that alternatively it is also possible within the scope of the invention to use separate runners, which are only functional during the weighing operation, for example.

A practical embodiment of the invention is obtained if the four runners are provided in pairs, wherein the runners of each pair are arranged coaxially.

In order to make it possible to use standard components for the product carrier as much as possible, it may be preferable if the track widths of the two runners of the respective pairs of runners are identical to each other.

In particular when such an embodiment is used it may furthermore be advantageous if one pair of runners is positioned obliquely behind the other pair of runners, seen in the conveying direction, which makes it possible in a suitable way to realise four parallel tracks.

It is also possible within the scope of the invention for the track widths of the two runners of the respective pairs of runners to be different from each other. The front two runners could thus be provided on the outer sides or, on the contrary, on the inner sides of the rear two runners, which would also make it possible to realise four parallel tracks.

If the distance apart between the two pairs of runners associated with a product carrier equals half the distance apart between two adjacent product carriers, the pitch of successive pairs of runners will be the same at all times, independent from the question whether they belong to the same product carrier or to two different product carriers. In this way an advantageous compromise is reached between the aim of achieving a high degree of stability of the product carriers on the one hand, for which purpose the product carriers are provided with four runners, and the aim of achieving accurate measurements on the other hand.

Alternatively it is also possible for the distance apart between the two pairs of runners associated with a product carrier to be smaller than half the distance apart between two adjacent product carriers. In this way relatively compact product carriers are obtained, which nevertheless exhibit a more stable behaviour than product carriers provided with only two runners.

Another possibility of creating four parallel tracks can be obtained if the running surfaces of at least two runners of the four runners are different from each other.

By configuring the running surfaces to be different from each other, a possibility is created to provide runners of a product carrier directly behind each other and nevertheless use different tracks, wherein one track is located within the width of the runners on the right-hand side and the other track is located within the width of the runners on the left-hand side. Within the scope of such an embodiment it may be preferable if the running surfaces of the at least two mutually different runners differ from each other as regards their position relative to the centre of the width of the runners in question and/or if each one of the rear two runners is provided directly behind one of the front two runners.

To prevent a runner from unintentionally rolling over a track intended for another runner, it may be advantageous if the vertical positions of at least two tracks of said four tracks are different from each other. In this way a runner can be made to hover over a track, for example, without coming into contact with said track on the weighbridge.

The above advantages can be realised in particular if the vertical positions of at least an outer track and a track adjacent thereto are different from each other.

In order to obtain an adequate centring of the product carriers, or in other words, to prevent product carriers from unintentionally moving sideways and runners of the product carriers following a "wrong" track or coming into contact therewith, it may be very advantageous if at least one track is located on a laterally inclined part of the weighbridge or, furthermore preferably, if at least two tracks are located on two respective laterally inclined parts of the weighbridge, wherein the two laterally inclined parts are inclined in opposite directions.

The advantages of the invention apply in particular if according to a possible embodiment the product carriers are interconnected, preferably via a driven chain.

The invention further relates to a method for weighing slaughter products using a device according to the invention as elucidated in the foregoing.

The invention will now be explained in more detail by means of a description of a preferred embodiment of a weighing device according to the invention, in which reference is made to the following figures:

FIGS. 4a and 4b are vertical cross-sectional views of the weighing guide part at the location of the rear pair of runners of the product carrier and at the location of the front pair of runners of the product carrier of FIG. 3.

Figure 1:
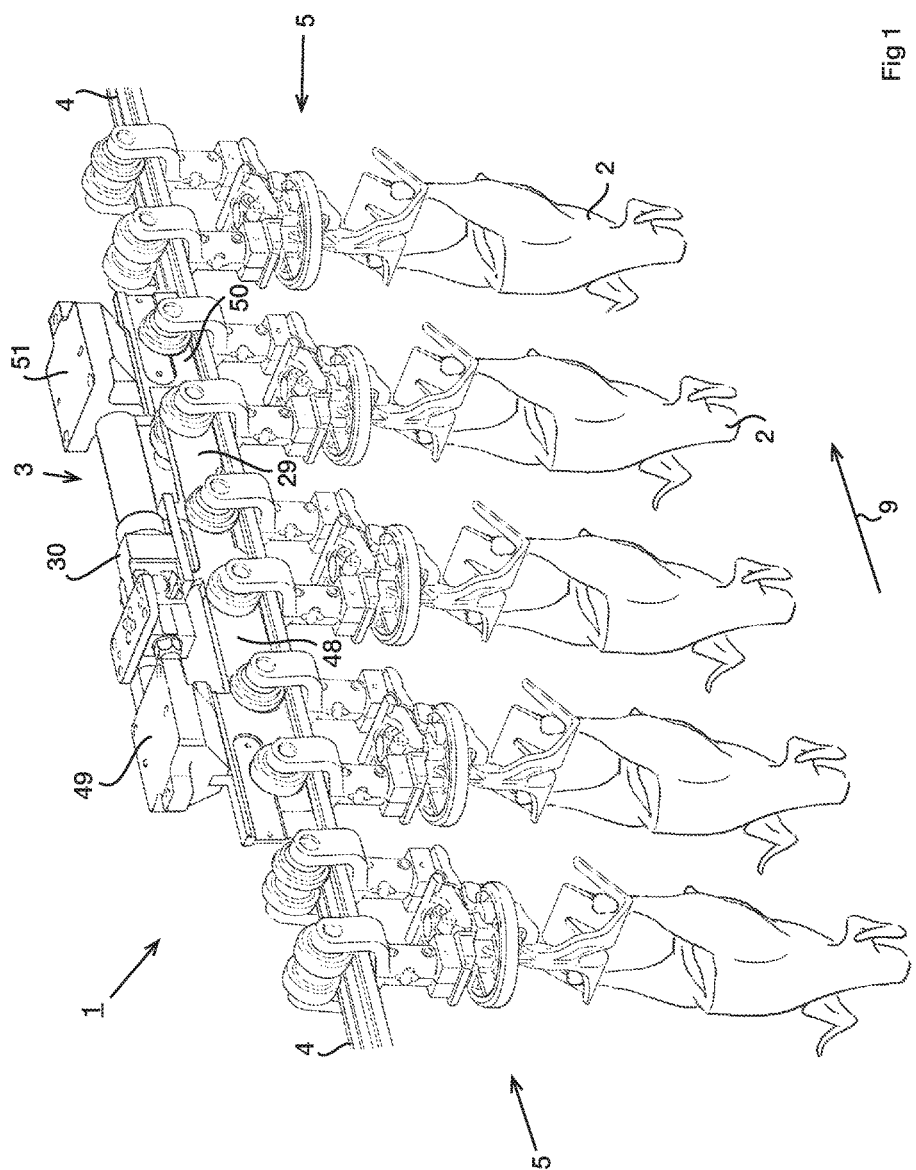
FIG. 1 is a perspective view of a possible embodiment of a weighing device according to the invention.

FIG. 1 shows a part of a distribution line 1 for distributing slaughter birds 2. In the part in question, the slaughter birds 2 are weighed by means of a weighbridge 3. The weighing results obtained on the weighbridge can be used for distributing the slaughter birds downstream of the weighing installation 3 for further processing.

The distribution line 1 comprises an endless guide 4, along which product carriers 5, from which the slaughter birds 2 are suspended, are being moved. For a detailed description of product carriers 5 reference is made to International patent application PCT/NL2015/050119, which publication is to be considered incorporated herein, at least insofar as it relates to the description of the product carriers. A limited description of the product carrier 5 herein will suffice.

Figure 3:
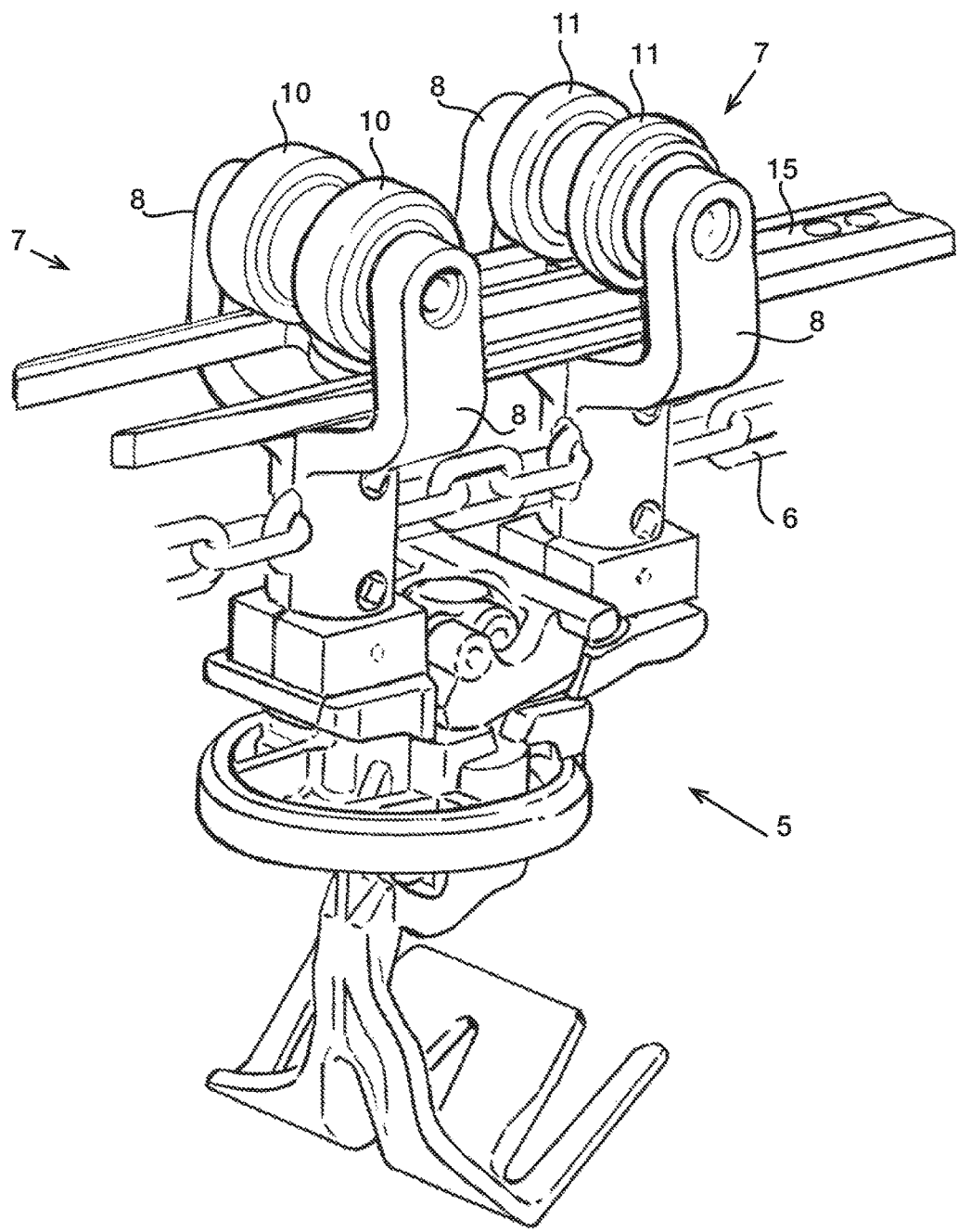
FIG. 3 shows the weighing guide part of FIG. 2 including a product carrier.

A single product carrier 5 is shown in FIG. 3. The product carriers 5 are interconnected via a driven chain 6, which is not shown in FIG. 1 for that matter. The product carrier 5 comprises two fork members 7 with two upwardly extending legs. The legs 8 of each fork member 7 extend along two opposite sides of the guide 4. Above the guide 4, the product carrier 5 comprises a runner for each leg 8, via which the product carriers are suspended from the guide 4.

Unlike the configuration disclosed in PCT/NL2015/050119, the four runners of each product carrier 5 are not identical to each other. The runners associated with the rear fork member 7, seen in the conveying direction 9, are identical to each other and are indicated by numeral 10. The runners 11 associated with the front fork member 7 are likewise identical to each other, but they are different from the runners 10. The centre-to-centre distance of the runners 10 and 11 equals half the pitch between the product carriers 5. The runners 10 and 11 will be described in more detail yet hereinafter.

Figure 2:
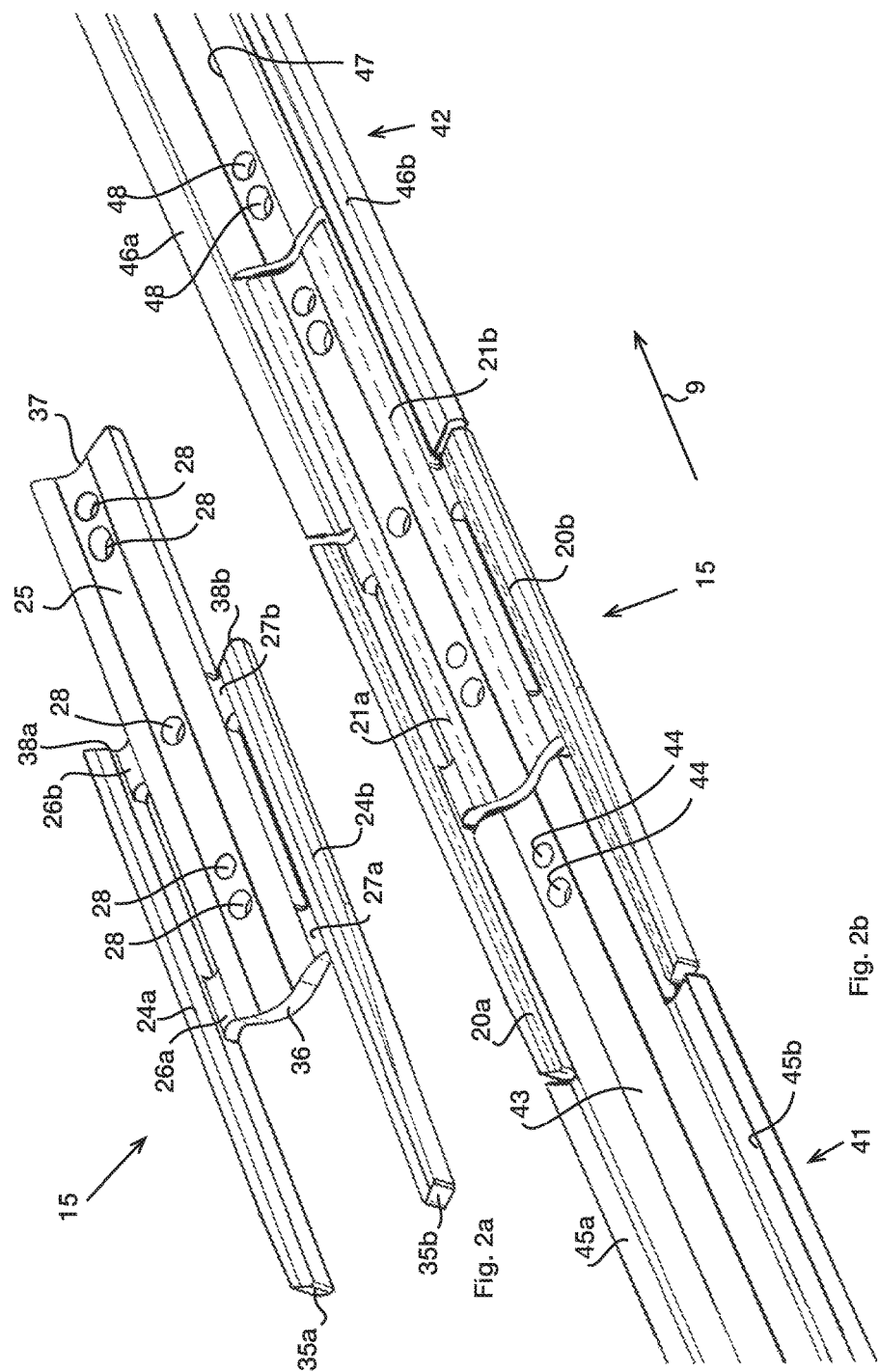
FIG. 2a shows a part of the guide that is used in the weighing of the slaughter products.
FIG. 2b shows the part of the guide shown in FIG. 2a plus guide parts connecting thereto.

The endless guide 4 comprises a weighing guide part 15, which is shown in FIG. 2a. The weighing guide part 15 also forms part of the weighing installation 3. The weighing of a slaughter bird 2 by the weighbridge 3 can only take place when all the runners 10, 11 of the product carriers 5 from which the slaughter bird 2 in question is suspended are present on the weighing guide part 15, which implies in practice that the runners 10, 11 in question are rolling over the weighing guide part 15. Within the framework of the present description, the weighing guide part 15 is synonymous with a weighbridge.

The configuration of the weighing guide part 15 has been selected so that it achieves, in combination with the specific configuration of the runners 10, 11 (yet to be described), that the four runners 10, 11 will roll onto the weighing guide part 15 simultaneously and also off the weighing guide part 15 simultaneously. The runners 10, 11 run over the weighing guide part 15 along four tracks 20a, 20b, 21a, 21b, which extend parallel to each other. The tracks 20a, 20b, 21a, 21b are located in the centre of the contact between the associated runners 10, 11 and the weighing guide part 15. For each of the tracks 20a, 20b, 21a, 21b, the weighing guide part 15 comprises four rolling surface parts 22a, 22b, 23a, 23b, on which the respective tracks 20a, 20b, 21a, 21b are present. The rolling surface parts 22a, 22b are located on the upper side of two outer rolling surface bodies 24a, 24b. The rolling surface parts 23a, 23b are provided on the upper side of a central rolling surface body 25 of the weighing guide part 15. The outer rolling surface body 24a is connected to the central rolling surface body 25 via bridge members 26a, 26b. In a similar manner, the outer rolling surface body 24b is connected to the central rolling surface body 25 via bridge members 27a, 27b.

Provided in the centre of the central rolling surface body 25 are a number of through fixing holes 28, via which the weighing guide part 15 is bolted to a central connecting plate 29, which in turn is suspended from the loading cell 30 of the weighing installation 3. The central connecting plate 29 extends between the two runners 10 and 11 associated with each of the fork members 7.

The rolling surface parts 22a, 22b are arranged in slightly inclined, mirror symmetrical relationship so as to obtain a centring effect when the runners 10 roll over the rolling surface parts 22a, 22b along the tracks 20a, 20b. For the same purpose, the rolling surface parts 21a, 21b are arranged in slightly inclined, mirror symmetrical relationship so as to obtain a centring effect when the runners 11 roll over the rolling surface parts 23a, 23b along the tracks 21a, 21b.

The runners 10 are conventional runners having a slightly convex, symmetrical running surface 31. The runners 11 are made by mechanically turning off a part of the runners 10 in the area 32, as is shown only for the runner 11 on the left-hand side in FIG. 4b. Alternatively, the runners 11 could be made in the same manner as the runners 10, viz. by being cast in a mould. The running surface 33 of each runner 11 is asymmetrical in shape, and also narrower than the running surface 31. At the location of their central axis, however, the width of the runners 11 is the same as the corresponding width of the runners 10. Each runner 10 is positioned directly behind (i.e. within the width of) a runner 11. In spite of the different configuration of the runners 11, at least insofar as the running surfaces 33 thereof are concerned, the product carriers 5 are suitable for being used in the entire distribution line 1. The distribution line 1 therefore does not require any further modifications so as to adapt it for use with product carriers 5 provided with, inter alia, the runners 11.

As already indicated in the foregoing, the four runners 10 and 11 will roll simultaneously onto and simultaneously off the weighing guide part 15 in use. For this purpose the lengths of the outer rolling surface bodies 24a, 24b on the one hand and the length of the central rolling surface body 25 on the other hand are the same. However, the outer rolling surface bodies 24a, 24b are connected to the central rolling surface body 25 via the bridge members 26a, 26b, 27a, 27b in such a manner that the rear ends 35a, 35b of the respective outer rolling surface bodies 24a, 24b are located behind the rear end 36 of the central rolling surface body 25, spaced therefrom by a distance equal to the pitch distance between the runners 10 of a product carrier 5 on the one hand and the runners 11 of said product carrier 5 on the other hand. The front end 37 of the central rolling surface body 25 is therefore located in front of the front ends 38a, 38b of the outer rolling surface bodies 24a, 24b, spaced therefrom by the same pitch distance. It is further important to note that the rolling surface parts 22a, 22b are positioned at a slightly higher level than the rolling surface parts 23a, 23b, as is shown in FIGS. 4a and 4b.

The above description of the weighing guide part 15 on the one hand and the runners 10, 11 on the other hand implies that, in use, all four runners 10, 11 roll onto the weighing guide part 15 simultaneously and off the weighing guide part 15 simultaneously. As appears from FIG. 2b, guide parts 41, 42 having a cross-section comparable to the weighing guide part 15 connect to the rear end as well as to the front end of the weighing guide part 15. The upstream guide part 41 has a central part 43, aligned with the central rolling surface body 25, which is provided with holes 44. Via said holes 44, the upstream guide part 41 is bolted to an upstream connecting plate 48, which in turn is suspended from a frame (not shown) via a connecting block 49. The front end of the central part 43 connects to the rear end 36 of the central rolling surface body 25. The upstream guide part 41 further comprises two outer parts 45a, 45b, the front ends of which connect to the rear ends 35a, 35b of the outer rolling surface bodies 24a, 24b.

In a corresponding manner the rear end of the outer parts 46a, 46b of the upstream guide part 42 connects to the front ends 38a, 38b of the outer rolling surface bodies 24a, 24b, and the rear end of the central part 47 of the upstream guide part 42 connects to the front end 37 of the central rolling surface body 25. The central part 47 is provided with fixing holes 48, via which the downstream guide part 42 is bolted to a downstream connecting plate 50, which is suspended, via a connecting block 51, from the aforementioned frame from which also the connecting block 49 is suspended.

The above-mentioned connections of the guide parts 41, 42 to the weighing guide part 15 are contactless connections, so that movements such as vibrations in the guide part 41, 42 cannot be directly transferred to the weighing guide part 15, which might interfere with the weighing operation by the weighbridge 3.

Before a product carrier 5, more specifically the runners 10, 11 thereof, rolls onto the weighing guide part 15 in use, the front runners 11 first pass the rear ends 35a, 35b of the outer rolling surface body 24a, 24b. As a result of the adapted shape of the running surfaces 33 of the runners 11, no contact will take place between the weighing guide part 15, more specifically the outer rolling surface bodies 24a, 24b thereof, even more specifically the tracks 22a, 22b thereof, on the one hand and the runners 11 on the other hand. The runners 11 and the runners 10 then arrive simultaneously at the rear end 36 of the central rolling surface body 25 and the rear ends 35a, 35b of the outer rolling surface bodies 24a, 24b, respectively. When the product carriers 5 move further ahead, all four runners 10, 11 will run onto the weighing guide part 15 simultaneously. Upon further movement ahead of the product carrier 5, the runners 10 will arrive at the front ends 38a, 38b of the outer rolling surface bodies 24a, 24b at the same moment when the runners 11 arrive at the front end 37 of the central rolling surface body 25. Upon even further movement ahead, all four runners 10, 11 will run off the weighing guide part 15 simultaneously. It is noted in that regard that the runners 10, having passed the weighing guide part 15, will roll onto the outer parts 46a, 46b of the downstream guide part 42 without coming into contact with the central rolling surface body 25 of the weighing guide part 15 on account of the higher position of the outer parts 46a, 46b relative to the central rolling surface body 25.

From the moment the four runners 10, 11 roll onto the weighing guide part 15 simultaneously until the moment the four runners 10, 11 roll off the weighing guide part 15 simultaneously, weighing operations can be carried out by means of the weighing installation 3. It will be understood that the weighing operation concerns not only the weighing of the slaughter birds 2 but also of the product carriers 5 and a part of the chain 6, whilst any tension in the chain will also affect the weighing result. It is advantageous to reduce the tension in the chain 6 as much as possible during the weighing process. In fact, gross weights are determined. International patent application WO 2013/154427 A1 describes, inter alia, an effective way of deriving the net weight of slaughter birds 2 from the gross weight. The publication in question furthermore describes in general terms how weighing operations can be carried out in an effective manner. The contents of WO 2013/154427 A1, insofar as they relate to a possible manner of determining a gross weight and the manner of deriving a net weight therefrom, are to be considered incorporated herein.

The invention must by no means be regarded as being limited to the above-described possible embodiment. The appended claims in the first place serve to define the intent of the present invention. By way of a possible variant it is pointed out, for example, that it is also possible to provide a product carrier 5 with separate runners which roll over a weighing guide part that does not form part of an endless guide such as the endless guide 4. Furthermore it is alternatively possible to use four identical runners, not one of which is positioned directly behind another runner, however, so that nevertheless four separate parallel tracks are provided rather than one track over which two runners of a product carrier roll. It is also possible to provide upright guide edges in one or a number of the rolling surface parts 21a, 21b, 22a, 22b for centring the product carriers 5. Furthermore it is possible to use the invention with different types of product carriers. More specifically, it would be possible to use product carriers of which the lower part, or in other words, the part of the product carriers that carries the product, is different, for example tailored to the specific product and/or the function to be performed by the product carrier. By way of illustration reference is made in this regard to the product carriers described in EP 557 821 B1 and EP 1 191 852 B1, with this understanding that said product carriers would have to be configured with four runners. As an aside it is further noted that the skilled person will appreciate that as a variant it is in any case possible to turn the weighing guide part 15 around. In that case a situation would actually be realised in which the product carriers 5 are moved in a direction opposite the conveying direction 9. With said reverse conveying direction, also the order of the runners 10 and 11 would thus be reversed. According to another alternative, shorter product carriers 5 are used in that the distance between the runners 10 on the one hand and the runners 11 on the other hand is decreased. The centre-to-centre distance of the runners 10 and 11 will not equal half the pitch distance between the product carriers 5 in that case; on the contrary, it will be smaller.

The invention claimed is:

1. A device for weighing slaughter products, comprising a guide which extends along a conveying path, product carriers which can be moved along the guide and which are configured for suspending slaughter products therefrom, and weighing means comprising a weighbridge, each product carrier comprising four runners, two of which runners being provided behind the other two runners, seen in the direction of movement, wherein the four runners are configured to roll over the weighbridge along respective tracks during a weighing interval upon movement of the product carrier, wherein the tracks extend parallel to each other, and the weighbridge and the four runners are configured such that the runners will roll simultaneously onto the weighbridge and simultaneously off the weighbridge.

2. A device according to claim 1, wherein the weighbridge forms part of the endless guide and the four runners are configured to roll over the guide upstream and downstream of the weighbridge during movement of the product carrier.

3. A device according to claim 1, wherein the four runners are provided in pairs, wherein the runners of each pair are arranged coaxially.

4. A device according to claim 3, wherein the track widths of the two runners of the respective pairs of runners are identical to each other.

5. A device according to claim 3, wherein one pair of runners is positioned obliquely behind the other pair of runners, seen in the conveying direction.

6. A device according to claim 3, wherein the track widths of the two runners of the respective pairs of runners are different from each other.

7. A device according to claim 3, wherein the distance apart between the two pairs of runners associated with a product carrier is smaller than half the distance apart between two adjacent product carriers.

8. A device according to claim 1, wherein the running surfaces of at least two runners of the four runners are different from each other.

9. A device according to claim 8, wherein each one of the rear two runners is provided directly behind one of the front two runners.

10. A device according to claim 1, wherein the vertical positions of at least two tracks of said four tracks are different from each other.

11. A device according to claim 10, wherein the vertical positions of at least an outer track and a track adjacent thereto are different from each other.

12. A device according to claim 1, wherein at least one track is located on a laterally inclined part of the weighbridge.

13. A device according to claim 12, wherein at least two tracks are located on two respective laterally inclined parts of the weighbridge, wherein the two laterally inclined parts are inclined in opposite directions.

14. A device according to claim 1, wherein the product carriers are interconnected, preferably via a driven chain.

15. A method for weighing slaughter products, wherein a device according to claim 1 is used.

* * * * *